United States Patent
Chen

(10) Patent No.: US 11,237,846 B2
(45) Date of Patent: Feb. 1, 2022

(54) METHOD, PROCESSING UNIT, TOUCH CONTROL CHIP, DEVICE AND MEDIUM FOR PROCESSING CONFIGURATION FILE

(71) Applicant: SHENZHEN GOODIX TECHNOLOGY CO., LTD., Shenzhen (CN)

(72) Inventor: Yanran Chen, Shenzhen (CN)

(73) Assignee: SHENZHEN GOODIX TECHNOLOGY CO., LTD., Shenzhen (CN)

(*) Notice: Subject to any disclaimer, the term of this patent is extended or adjusted under 35 U.S.C. 154(b) by 336 days.

(21) Appl. No.: 16/455,636

(22) Filed: Jun. 27, 2019

(65) Prior Publication Data
US 2019/0317778 A1    Oct. 17, 2019

Related U.S. Application Data

(63) Continuation of application No. PCT/CN2017/117529, filed on Dec. 20, 2017.

(51) Int. Cl.
*G06F 9/445* (2018.01)
*G06F 8/654* (2018.01)
(Continued)

(52) U.S. Cl.
CPC .......... *G06F 9/44505* (2013.01); *G06F 8/654* (2018.02); *G06F 9/4418* (2013.01); *G06F 9/44536* (2013.01)

(58) Field of Classification Search
CPC .... G06F 9/44505; G06F 8/654; G06F 9/4418; G06F 9/44536
See application file for complete search history.

(56) References Cited

U.S. PATENT DOCUMENTS 9,116,774 B2 * 8/2015 Rajagopalan .............. G06F 8/65
2003/0074657 A1 * 4/2003 Bramley, Jr. .............. G06F 8/65
717/168
(Continued)

FOREIGN PATENT DOCUMENTS

CN    102915284 A    2/2013
CN    104102567 A    10/2014
(Continued)

OTHER PUBLICATIONS

Solomon Systech Limited SSD2531 Product Preview: 21 Driving x 12 Sensing Capacitive Touch Panel Controller Solomon Systech Semiconductor Technical Data ; (Apr. 2010); pp. 1-58.
(Continued)

*Primary Examiner* — Jaweed A Abbaszadeh
*Assistant Examiner* — Gayathri Sampath
(74) *Attorney, Agent, or Firm* — J.C. Patents

(57) ABSTRACT

The present application provides a method, a processing unit (12), a touch control chip (11), a device, and a medium for processing a configuration file. The method includes: determining (S201) the configuration file of a touch control chip (11); and writing (S202) the configuration file to the touch control chip (11); where the configuration file comprises a plurality of first configuration modules which are respectively used for configuring parameters with different attributes for the touch control chip (11). Thus, the configuration efficiency of the touch control chip (11) is improved.

13 Claims, 8 Drawing Sheets

(51) Int. Cl.
G06F 9/4401 (2018.01)
G06F 3/041 (2006.01)

(56) References Cited

U.S. PATENT DOCUMENTS

2009/0282399 A1* 11/2009 Kamrowski ............ G06F 8/658
717/174
2012/0102477 A1* 4/2012 Kim ........................ G06F 8/654
717/169
2014/0232672 A1 8/2014 Zhang
2015/0035758 A1* 2/2015 Nandakumar ........ G06F 3/0445
345/173
2016/0018921 A1* 1/2016 Matlick ............... G06F 3/04166
345/174
2016/0291965 A1* 10/2016 Li ............................ G06F 8/65
2016/0342252 A1* 11/2016 Yeh .................... G06F 13/4027

FOREIGN PATENT DOCUMENTS

| CN | 105912265 A | 8/2016 |
| CN | 107037352 A | 8/2017 |
| CN | 107483556 A | 12/2017 |

OTHER PUBLICATIONS

Chinese International Search Report of corresponding international application No. PCT/CN2017/117529, dated Sep. 20, 2018.
Anonymous: INI file Wikipedia, the free encyclopedia, (Jan. 2012), pp. 1-7.
Extended European Search Report of corresponding European application No. 17 93 5049, dated Nov. 14, 2019.

* cited by examiner

| Packet header | | | | | First configuration module 1 | | | |
|---|---|---|---|---|---|---|---|---|
| Config-uration version number | Configuration flag | Total packet number of configur-ation | Chec-ksum | Module number | Module length | Module content | Module checksum |
| | 0: indicating that the entire configuration file is con-figured<br><br>1: indicating that at least one configuration module is updated | n+1 | | 1 | | | |

......

| First configuration module 2 | | | | | First configuration module n+1 | | | |
|---|---|---|---|---|---|---|---|---|
| Module number | Module length | Module content | Module chec-ksum | Module number | Module length | Module content | Module checksum |
| 2 | | | | n+1 | | | |

FIG. 3

METHOD, PROCESSING UNIT, TOUCH CONTROL CHIP, DEVICE AND MEDIUM FOR PROCESSING CONFIGURATION FILE

CROSS-REFERENCE TO RELATED APPLICATION

This application is a continuation of International Application No. PCT/CN2017/117529, filed on Dec. 20, 2017, which is incorporated herein by reference in their entirety.

TECHNICAL FIELD

The present application relates to the field of touch screen technology, and in particular to a method, a processing unit, a touch control chip, a device, and a medium for processing a configuration file.

BACKGROUND

At present, touch control chips have been widely used in smart terminals such as mobile phones, notebook computers and tablet computers. A touch control chip is loaded with a configuration file for algorithm modules. As software functions increase, the existing configuration file is about to be exhausted, and parameters that need to be updated or added in the configuration file are gradually increased.

In the prior art, a Micro Controller Unit (MCU) or a Central Processing Unit (CPU) writes the configuration file to the touch control chip as a whole. However, in this case, when it is necessary to update or increase the parameters of the configuration file, the MCU or CPU needs to reconfigure an entire updated configuration file to the touch control chip, thereby reducing the configuration efficiency of the touch control chip.

SUMMARY

The present application provides a method, a processing unit, a touch control chip, a device, and a medium for processing a configuration file, thereby improving configuration efficiency of a touch control chip.

In a first aspect, the present application provides a method for processing a configuration file, including: determining the configuration file of a touch control chip; writing the configuration file to the touch control chip; where the configuration file includes a plurality of first configuration modules which are respectively used for configuring parameters of different attributes for the touch control chip.

The beneficial effect of the present application includes: since the configuration file includes a plurality of first configuration modules, the processing unit updates a configuration module instead of reconfiguring the touch control chip when the parameters of the configuration file need to be updated or added, thereby improving the configuration efficiency of the touch control chip.

Optionally, the touch control chip includes a temporary variable region which is used for temporarily storing the configuration file and a non-configuration file of the touch control chip in different time periods, respectively; and the writing the configuration file to the touch control chip includes: writing the configuration file to the temporary variable region when it is determined that the temporary variable region is currently in an idle state.

The beneficial effect of the present application includes: since the touch control chip includes a temporary variable region, the configuration file is temporarily stored in the temporary variable region instead of being permanently stored in the variable region, thereby achieving the purpose of saving storage space. Further, the temporary variable region can be reused by the configuration file and the non-configuration file, thereby improving the utilization of the storage space.

Optionally, the method further includes: sending a read request to the touch control chip when it is determined that the temporary variable region is currently in an idle state, so that the touch control chip reads a parsed configuration file from a flash memory to the temporary variable region according to the read request; and reading the parsed configuration file from the temporary variable region.

The beneficial effect of the present application includes: since the parsed configuration file is permanently stored in a flash memory, on the basis of this, when the processing unit needs to read the configuration file, a read request needs to be sent to the touch control chip, so that the touch control chip reads the parsed configuration file from the flash memory to the temporary variable region according to the read request, thereby achieving the reading of the parsed configuration file by the processing unit.

Optionally, the touch control chip further includes a global variable region which is used for storing at least one second configuration module, where the at least one second configuration module is obtained after at least one corresponding first configuration module is updated; and the method further includes writing the at least one second configuration module to the global variable region.

The beneficial effect of the present application includes: since the second configuration module is permanently stored to the global variable region, there are fewer interactive commands between the processing unit and the touch control chip, thereby improving the updating efficiency of the configuration file.

Optionally, storage space of the global variable region is smaller than that of the temporary variable region, and a starting storage address of the temporary variable region is smaller than that of the global variable region.

The beneficial effect of the present application includes: since the global variable region has smaller storage space than the temporary variable region, thus the purpose of reducing storage space is achieved.

Optionally, the method further includes: reading the at least one second configuration module from the global variable region.

The method for processing the configuration file corresponding to the touch control chip side is described below. The effects thereof are the same as or similar to those of the method for processing the configuration file corresponding to the processing unit side, which will not be described below.

In a second aspect, the present application provides a method for processing a configuration file, including: obtaining a configuration file of a touch control chip; parsing the configuration file to obtain a parsed configuration file; and configuring the parsed configuration file to each algorithm module of the touch control chip; where the configuration file includes a plurality of first configuration modules which are respectively used for configuring parameters of different attributes for the touch control chip.

Optionally, the touch control chip includes a temporary variable region which is used for temporarily storing the configuration file and a non-configuration file of the touch control chip in different time periods, respectively; and after the parsing the configuration file to obtain the parsed configuration file, the method further includes: storing the parsed configuration file to a flash memory and deleting the configuration file in the temporary variable region.

Optionally, the method further includes: receiving a read request; and reading the parsed configuration file from the flash memory to the temporary variable region according to the read request.

Optionally, the touch control chip further includes a global variable region which is used for storing at least one second configuration module, where the at least one second configuration module is obtained after at least one corresponding first configuration module is updated; and the method further includes: obtaining the at least one second configuration module, and parsing the at least one second configuration module and configuring the parsed at least one second configuration module to at least one corresponding algorithm module of the touch control chip.

Optionally, storage space of the global variable region is smaller than that of the temporary variable region, and a starting storage address of the temporary variable region is smaller than that located in the global variable region.

The processing unit, the touch control chip, the device and the medium are described below, and the implementation principles and technical effects thereof are similar to those of the method related to the first aspect, the method related to the second aspect, the optional modes of the first aspect, and the optional modes of the second aspect, which will not be described below.

In a third aspect, the present application provides a processing unit which is configured to: determine a configuration file of a touch control chip; and write the configuration file to the touch control chip; where the configuration file includes a plurality of first configuration modules which are respectively configured to configure parameters of different attributes for the touch control chip.

Optionally, the touch control chip includes a temporary variable region which is configured to temporarily store the configuration file and a non-configuration file of the touch control chip in different time periods, respectively; and the processing unit is specifically configured to: write the configuration file to the temporary variable region when it is determined that the temporary variable region is currently in an idle state.

Optionally, the processing unit is further configured to: send a read request to the touch control chip when it is determined that the temporary variable region is currently in an idle state, so that the touch control chip reads a parsed configuration file from a flash memory to the temporary variable region according to the read request; and read the parsed configuration file from the temporary variable region.

Optionally, the touch control chip further includes a global variable region which is configured to store at least one second configuration module, where the at least one second configuration module is obtained after at least one corresponding first configuration module is updated; and the processing unit is further configured to: write the at least one second configuration module to the global variable region.

Optionally, storage space of the global variable region is smaller than that of the temporary variable region, and a starting storage address of the temporary variable region is smaller than that of the global variable region.

Optionally, the processing unit is further configured to read the at least one second configuration module from the global variable region.

In a fourth aspect, the present application provides a touch control chip, where the touch control chip is configured to: obtain a configuration file of the touch control chip; parse the configuration file to obtain a parsed configuration file; and configure the parsed configuration file to each algorithm module of the touch control chip; where the configuration file includes a plurality of first configuration modules which are respectively configured to configure parameters of different attributes for the touch control chip.

Optionally, the touch control chip includes a temporary variable region which is configured to temporarily store the configuration file and a non-configuration file of the touch control chip in different time periods, respectively; and the touch control chip is further configured to: store the parsed configuration file to a flash memory and delete the configuration file in the temporary variable region.

Optionally, the touch control chip is further configured to: receive a read request; and read the parsed configuration file from the flash memory to the temporary variable region according to the read request.

Optionally, the touch control chip further includes a global variable region which is configured to store at least one second configuration module, where the at least one second configuration module is obtained after at least one corresponding first configuration module is updated; and the touch control chip is further configured to: obtain the at least one second configuration module, and parse the at least one second configuration module and configure the parsed at least one second configuration module to at least one corresponding algorithm module of the touch control chip.

Optionally, storage space of the global variable region is smaller than that of the temporary variable region, and a starting storage address of the temporary variable region is smaller than that located in the global variable region.

In a fifth aspect, the present application provides a touch device including a processing unit described in any one of the third aspect and the optional modes of the third aspect and a touch control chip described in any one of the fourth aspect and the optional modes of the fourth aspect.

In a sixth aspect, the present application provides a computer storage medium including computer instructions, when executed by a computer, causing the computer to implement a method described in any one of the first aspect, the second aspect, the optional modes of the first aspect, and the second modes of the second aspect.

In a seventh aspect, the present application provides a computer program product including instructions, when executed by a computer, causing the computer to perform a method described in any one of the first aspect, the second aspect, the optional modes of the first aspect, and the second modes of the second aspect.

The present application provides a method, a processing unit, a touch control chip, a device, and a medium for processing a configuration file. The method includes: determining the configuration file of a touch control chip; and writing the configuration file to the touch control chip; where the configuration file includes a plurality of first configuration modules which are respectively used for configuring parameters of different attributes for the touch control chip. Since the configuration file includes a plurality of first configuration modules, the processing unit updates a configuration module instead of reconfiguring the touch control chip when the parameters of the configuration file need to be updated or added, thereby improving the configuration efficiency of the touch control chip.

BRIEF DESCRIPTION OF DRAWINGS

In order to illustrate the embodiments of the present application or the technical solutions in the prior art more clearly, the accompanying drawings used in the description of the embodiments or the prior art will be briefly illustrated below. Obviously, the accompanying drawings in the following description are some embodiments of the present application, and other accompanying drawings can be obtained according to the accompanying drawings without any creative work for those skilled in the art.

FIG. 3 is a schematic diagram of a format of a configuration file provided by an embodiment of the present application;

DESCRIPTION OF EMBODIMENTS

In order to make the purpose, technical solutions and advantages of the embodiments of the present disclosure clearer, the technical solutions of the embodiments of the present disclosure will be clearly and completely described below with reference to the accompanying drawings in the embodiments of the present disclosure. Apparently, the described embodiments are part of the embodiments of the present application, rather than all of the embodiments. On the basis of the embodiments of the present application, all other embodiments obtained by those of ordinary skilled in the art without creative work fall within the protection scope of the present application.

The terms "first", "second", and the like (if any) in the specification and claims of the present application and the above accompanying drawings are used to distinguish similar objects, and are not necessarily used to describe a particular order or sequence. It should be understood that the data used in this way may be interchanged as appropriate, so that the embodiments of the present application described herein can be implemented, for example, in a sequence other than those illustrated or described herein. In addition, the terms "comprise", and "include" and any variations thereof are intended to cover a non-exclusive inclusion, for example, a process, a method, a device, a product or a device that comprises a series of steps or units is not necessarily limited to those steps or units clearly listed, but may include other steps or units that are not explicitly listed or that are inherent to such processes, methods, products or devices.

In the prior art, an MCU or CPU writes a configuration file to a touch control chip as a whole. However, when it is necessary to update or increase parameters of the configuration file, the MCU or CPU needs to reconfigure the touch control chip, thereby reducing the configuration efficiency of the touch control chip. In order to solve this technical problem, the present application provides a method, a processing unit, a touch control chip, a device, and a medium for processing a configuration file.

Embodiment 1

Figure 1:
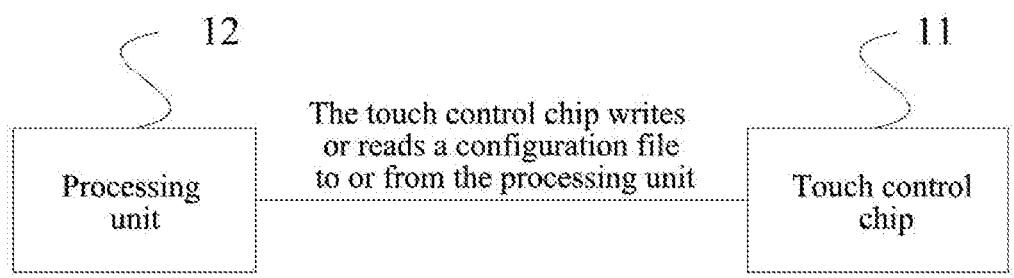
FIG. 1 is a schematic diagram of an application scenario of a method and a device for processing a configuration file provided by an embodiment of the present application.
Figure 2:
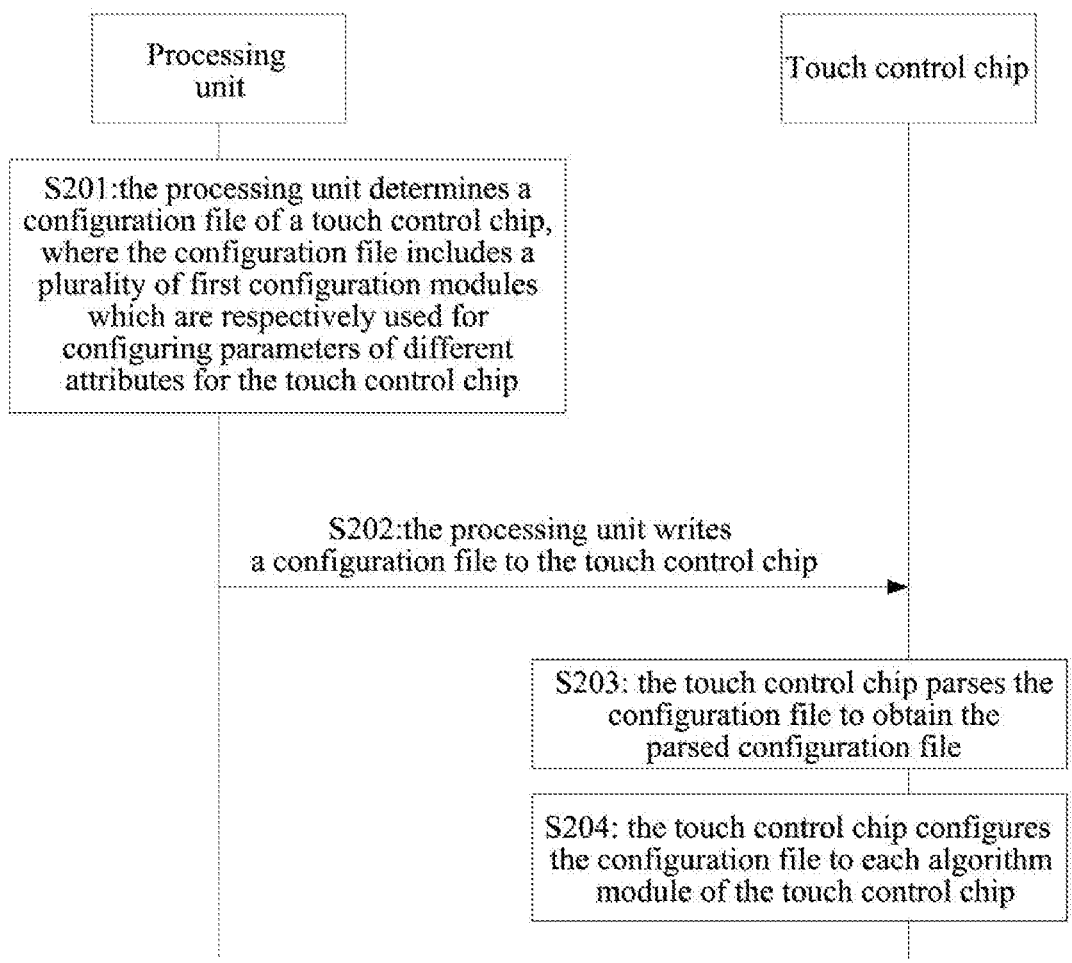
FIG. 2 is an interaction flowchart of a method for processing a configuration file provided by an embodiment of the present application.

FIG. 1 is a schematic diagram of an application scenario of a method and a device for processing a configuration file provided by an embodiment of the present application. As shown in FIG. 1, the touch control chip 11 may be disposed on a mobile phone, a notebook computer, a computer, a digital broadcast terminal, a messaging device, a game console, a tablet device, a medical equipment, a fitness equipment, a personal digital assistant, a kitchen appliance, a bathroom appliance, an air conditioner, a lighting lamp or other smart terminals with a touch screen, a touch pad or a touch button. A processing unit 12 may be an MCU, a CPU, a graphics processing unit (GPU) or the like, where the processing unit 12 is configured to write or read the configuration file or the like, to or from the touch control chip 11. Specifically, FIG. 2 is an interaction flowchart of a method for processing a configuration file provided by an embodiment of the present application. As shown in FIG. 2, the method includes the following process.

Step S201: the processing unit determines a configuration file of a touch control chip, where the configuration file includes a plurality of first configuration modules which are respectively used for configuring parameters of different attributes for the touch control chip.

Optionally, the configuration file includes: a resolution and an interrupt mode of a touch screen corresponding to the touch control chip, a working frequency band of the touch control chip, a type of the touch control chip, etc. Among them, the type of the touch control chip includes self-capacitance and mutual capacitance.

As mentioned above, the configuration file includes a plurality of first configuration modules. Specifically, FIG. 3 is a schematic diagram of a format of a configuration file provided by an embodiment of the present application. As shown in FIG. 3, the configuration file includes a packet header and n+1 first configuration modules, that is, the first configuration module 1, the first configuration module 2, . . . , the first configuration module n+1. The packet header includes a configuration version number, a configuration flag, a total packet number of the configuration, and a checksum. When the configuration flag is 0, it indicates that the entire configuration file is configured and when the configuration flag is 1, it indicates that at least one configuration module is updated; or, when the configuration flag is 1, it indicates that the entire configuration file is configured, and when the configuration flag is 0, it indicates that at least one configuration module is updated, which is not limited in the present application. The total packet number of the configuration refers to the number of configuration modules included in the configuration file. The checksum is used for the touch control chip to determine whether the packet header of the configuration file has been received completely. It should be noted that the present application does not limit how to determine the checksum.

As shown in FIG. 3, each first configuration module includes a module number, a module length, a module content, and a module checksum. The module number refers to the number of the first configuration module. For example, the number of the first configuration module 1 is 1, and the number of the first configuration module n+1 is n+1. The module length refers to a length of the first configuration module. The content of the module refers to a content included in the first configuration module. For example, the configuration content included in the first configuration module 1 is the resolution of the touch screen corresponding to the touch control chip, the configuration content included in the first configuration module 2 is the interrupt mode of the touch screen corresponding to the touch control chip, and the configuration content included in the first configuration module 3 is the working frequency band of the touch control chip. The module checksum is used for the touch control chip to determine whether the first configuration module has been received. The present application does not limit how to determine the module checksum.

Optionally, the processing unit may use an array of structures to store the plurality of first configuration modules included in the configuration file, and may determine the first configuration module according to a starting address and a length of each first configuration module.

Step S202: the processing unit writes the configuration file to the touch control chip;

The touch control chip includes a command region for the processing unit or the touch control chip to write a command. Specifically, step S202 includes: when the processing unit acquires that the command region of the touch control chip to be in an idle state, the processing unit sends a first command to the command region, where the first command indicates that the processing unit is to write the configuration file to the touch control chip. After receiving the first command sent by the processing unit, the touch control chip writes a second command to the command region, where the second command indicates waiting for delivering the configuration file. The processing unit delivers the configuration file to the touch control chip. After the configuration file is delivered completely, the processing unit writes a third command to the command region, where the third command indicates that the configuration file has been delivered completely.

Step S203: the touch control chip parses the configuration file to obtain a parsed configuration file.

Step S204: the touch control chip configures the configuration file to each algorithm module of the touch control chip.

It is illustrated with reference to step S203 and step S204: after receiving the configuration file, the touch control chip parses the packet header and determines through the checksum of the packet header, whether the packet header has been completely received. When it is determined that the packet header has been completely received, the touch control chip performs legality verification on the packet header. In the present application, the touch control chip may performs legality verification on the packet header by using the prior art, which will not be described in the present application. After determining that the packet header is legal, the touch control chip parses each of first configuration modules in turn according to a number sequence of the first configuration modules. As for each of the first configuration modules, the touch control chip determines whether the first configuration module has been completely received through the module checksum of the first configuration module. When the first configuration module has been received completely, the touch control chip performs legality verification on the first configuration module. In the present application, the touch control chip may perform legality verification on the first configuration module by using the prior art, which will not be described in the present application. After all the first configuration modules are verified to be legal, the touch control chip configures the parsed configuration file to each algorithm module of the touch control chip. For example, the touch control chip configures the resolution of the touch screen to an algorithm module which is used for configuring or adjusting the resolution; the touch control chip configures the interrupt mode of the touch screen to an algorithm module which is used for configuring the interrupt mode; and the touch control chip configures the working frequency band of the touch control chip to an algorithm module which is used for configuring or adjusting the working frequency band of the touch control chip.

It should be noted that, compared with the configuration file before being parsed, the parsed configuration file does not include the packet header, or does not include the packet header and the module checksum of each first configuration module, and the like. The content and form of the parsed configuration file are not limited in the present application.

The present application provides a method for processing a configuration file, which includes: a processing unit determines a configuration file of a touch control chip; the processing unit writes the configuration file to the touch control chip; the touch control chip parses the configuration file to obtain a parsed configuration file; and the touch control chip configures the configuration file to each algorithm module of the touch control chip. Since the configuration file includes a plurality of first configuration modules, the processing unit updates the configuration module instead of reconfiguring the touch control chip when the parameters of the configuration file need to be updated or added, thereby improving the configuration efficiency of the touch control chip.

Embodiment 2

Figure 4:
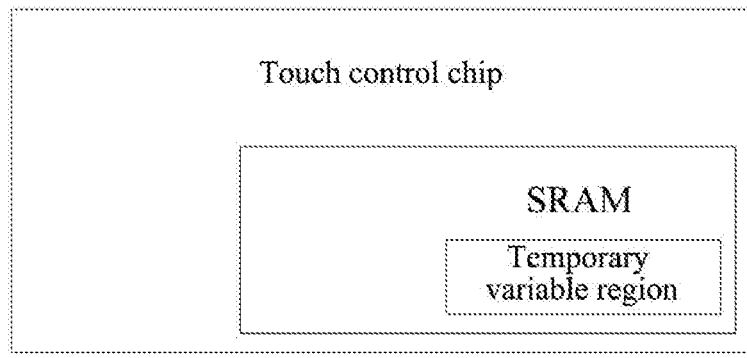
FIG. 4 is a schematic diagram of a touch control chip provided by an embodiment of the present application.

On the basis of the Embodiment 1, the touch control chip further includes a temporary variable region. FIG. 4 is a schematic diagram of a touch control chip provided by an embodiment of the present application. As shown in FIG. 4, the touch control chip is integrated with static random access memory (SRAM) which includes a temporary variable region for temporarily storing a configuration file and a non-configuration file of the touch control chip in different time periods. That is, the configuration file and the non-configuration file can reuse the temporary variable region in different time periods. For example, during a time period 1, the temporary variable region temporarily stores the configuration file of the touch control chip, and during the time period 2, the temporary variable region temporarily stores the non-configuration file of the touch control chip, where the non-configuration file may include detected touch coordinates, etc.

Figure 5:
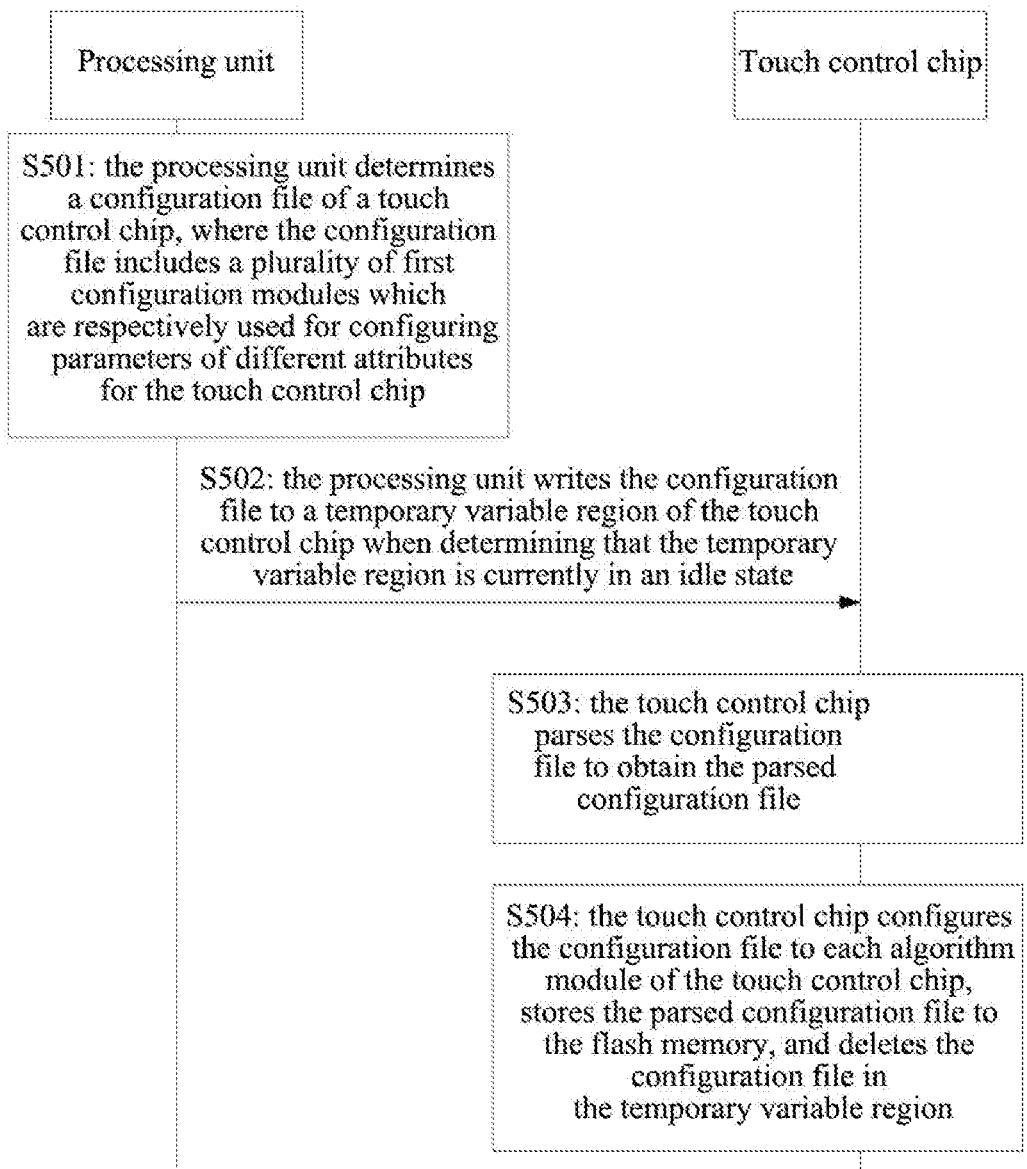
FIG. 5 is an interaction flowchart of a method for processing a configuration file provided by another embodiment of the present application.

Correspondingly, FIG. 5 is an interaction flowchart of a method for processing a configuration file provided by another embodiment of the present application. As shown in FIG. 5, the method includes the following process:

step S501: a processing unit determines a configuration file of a touch control chip, where the configuration file includes a plurality of first configuration modules which are respectively used for configuring parameters of different attributes for the touch control chip;

step S502: the processing unit writes the configuration file to a temporary variable region of the touch control chip when determining that the temporary variable region is currently in an idle state;

step S503: the touch control chip parses the configuration file to obtain the parsed configuration file; and step S504: the touch control chip configures the configuration file to each algorithm module of the touch control chip, stores the parsed configuration file to a flash memory, and deletes the configuration file in the temporary variable region.

Step S501 is the same as step S201, and the content and effect thereof are not described herein again.

Referring to step S502 to step S504, when the processing unit acquires that the command region of the touch control chip is in an idle state and the temporary variable region is currently in an idle state, the processing unit sends a first command to the command region. The temporary variable region being currently in an idle state indicates that the temporary variable region is neither occupied by a configuration file nor occupied by a non-configuration file. The first command indicates that the processing unit is to write the configuration file to the touch control chip. After receiving the first command sent by the processing unit in a polling way, the touch control chip stops the main loop and writes the second command into the command region, where the second command indicates waiting for the configuration file to be delivered. The processing unit delivers the configuration file to the touch control chip. After the delivery is completed, the processing unit writes a third command to the command region, where the third command indicates that the configuration file has been delivered completely. After receiving the configuration file, the touch control chip stores the configuration file into the temporary variable region, parses the packet header, and determines whether the packet header has been completely received through the checksum of the packet header. When determining that the packet header has been completely received, the touch control chip then performs legality verification on the packet header. After determining that the packet header is legal, the touch control chip sequentially analyzes each first configuration module according to the number sequence of each first configuration module. As for each first configuration module, it is determined whether the first configuration module has been completely received through the module checksum of the first configuration module. When the first configuration module has been completely received, the touch control chip then performs the legality verification on the first configuration module. After all of the first configuration modules are verified to be legal, the touch control chip configures the parsed configuration file to each algorithm module of the touch control chip, and stores the parsed configuration file to the flash memory and deletes the configuration file in the temporary variable region for the non-profile to use the temporary variable region. The touch control chip continues to enter the main loop and writes a fourth command in the command region to clear the command region.

In the present application, since the touch control chip includes a temporary variable region, the configuration file is temporarily stored in the temporary variable region instead of being permanently stored in the variable region, thereby achieving the purpose of saving storage space. Further, since the temporary variable region can be reused by the configuration file and the non-configuration file, the utilization of the storage space can be improved.

Embodiment 3

Figure 6:
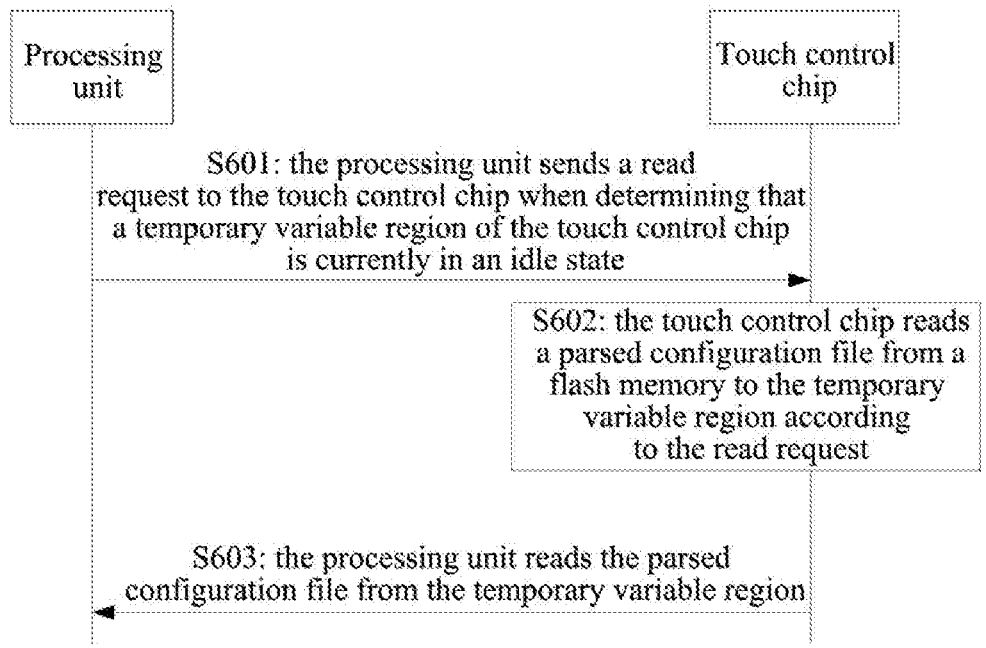
FIG. 6 is an interaction flowchart of a method for processing a configuration file provided by still another embodiment of the present application.

On the basis of Embodiment 2, the following further provides a process for a processing unit to read a configuration file from a touch control chip. Specifically, FIG. 6 is an interaction flowchart of a method for processing a configuration file provided by yet another embodiment of the present application. As shown in FIG. 6, the method includes the following process:

step S601: a processing unit sends a read request to a touch control chip when determining that a temporary variable region of the touch control chip is currently in an idle state;

step S602: the touch control chip reads a parsed configuration file from a flash memory to the temporary variable region according to the read request; and step S603: the processing unit reads the parsed configuration file from the temporary variable region.

Specifically, when the processing unit acquires that the command region of the touch control chip is idle and the temporary variable region is currently in an idle state, the processing unit writes a read request to the command region. The temporary variable region being currently in an idle state, indicates that the temporary variable region is neither occupied by a configuration file nor occupied by a non-configuration file. The read request may be a fifth command. The fifth command indicates that the processing unit is to read the configuration file parsed by the touch control chip, and the fifth command triggers the touch control chip to read the parsed configuration file from the flash memory, and stores the parsed configuration file in the temporary variable region. At this time, the touch control chip writes a sixth command to the command region, which indicates that the parsed configuration file required by the processing unit has been prepared. Finally, the processing unit reads the parsed configuration file from the temporary variable region and writes the forth command to the command region to clear the command region.

In the present application, since the parsed configuration file is permanently stored in the flash memory, on the basis of this, when the processing unit needs to read the configuration file, it needs to send a read request to the touch control chip, so that the touch control chip reads the parsed configuration file from the flash memory to the temporary variable region according to the read request, thereby implementing that the processing unit reads the parsed configuration file.

Embodiment 4

Further, since a configuration file is large, the present application temporarily stores the configuration file in a temporary variable region. First configuration modules included in the configuration file may be small. On the basis of this, the present application can set a global variable region in a touch control chip. The global variable region may be used by at least one second configuration module which may be any updated first configuration module.

Figure 7:
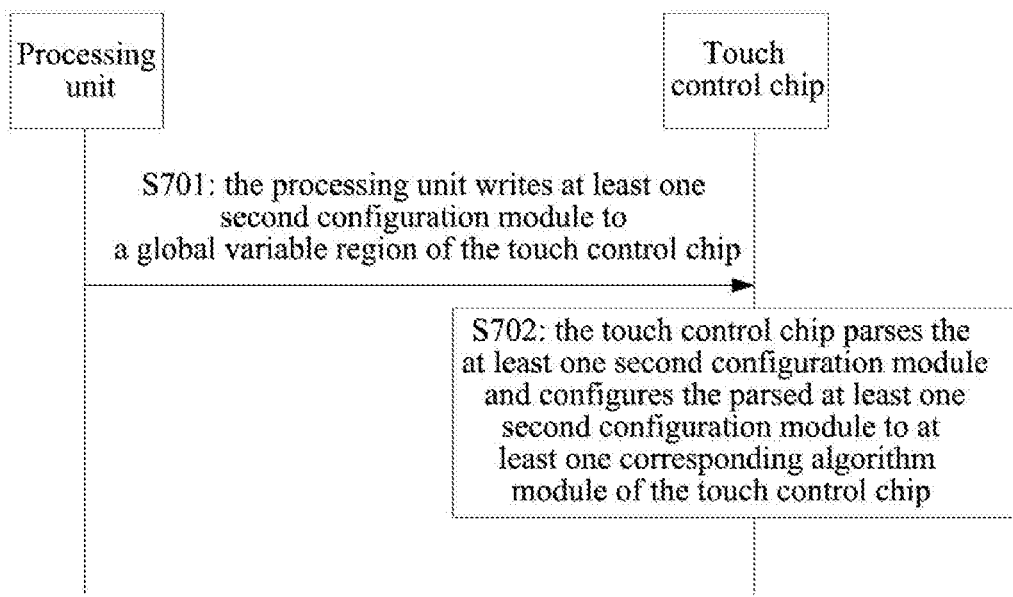
FIG. 7 is an interaction flowchart of a method for processing a configuration file provided by yet another embodiment of the present application.

Specifically, FIG. 7 is an interaction flowchart of a method for processing a configuration file provided by still another embodiment of the present application. As shown in FIG. 7, the method includes the following process.

Step S701: a processing unit writes at least one second configuration module to a global variable region of a touch control chip.

When the processing unit acquires that the command region of the touch control chip is idle, the processing unit writes a seventh command to the command region which indicates that the processing unit is to write at least one second configuration module to the global variable region, and delivers the at least one second configuration module to the touch control chip. After receiving the command, the touch control chip stores the at least one second configuration module to the global variable region.

Optionally, if a configuration flag of 0 indicates that the entire configuration file is configured, and a configuration flag of 1 indicates that at least one configuration module is updated, then the configuration flag of the packet header to which the at least one second configuration module belongs may be set to 1 when the processing chip writes the at least one second configuration module to the global variable region,. Correspondingly, when a configuration flag of 1 indicates that the entire configuration file is configured and a configuration flag of 0 indicates that at least one configuration module is updated, then, the configuration flag of the packet header to which at least one second configuration module belongs may be set to 0 when the processing chip writes the at least one second configuration module to the global variable region.

Step S702: the touch control chip parses the at least one second configuration module and configures the parsed at least one second configuration module to at least one corresponding algorithm module of the touch control chip.

Specifically, the touch control chip determines whether the second configuration module has been completely received through the module checksum of the second configuration module. When the second configuration module has been completely received, the touch control chip performs legality verification on the second configuration module. After the second configuration module is verified to be legal, the touch control chip configures the parsed second configuration module to the corresponding algorithm module.

Figure 8:
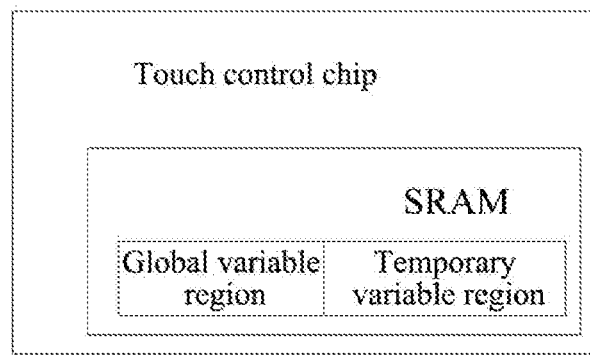
FIG. 8 is a schematic diagram of a touch control chip provided by an embodiment of the present application.

Optionally, FIG. 8 is a schematic diagram of a touch control chip provided by an embodiment of the present application. As shown in FIG. 8, on the basis of FIG. 4, the SRAM further includes a global variable region. Storage space of the global variable region is smaller than that of the temporary variable region, and a starting storage address of the temporary variable region is smaller than a starting storage address of the global variable region. For example, the storage space of the global variable region is less than 32 bytes, and the storage space of the temporary variable region is larger than 32 bytes.

In the temporary variable region, since the temporary variable region is a reused temporary region, there are lots of interactive commands between the processing unit and the touch control chip. The global variable region set by the present application has a smaller storage space than the temporary variable region, thereby achieving the purpose of reducing the storage space. Further, since the second configuration module is permanently stored to the global variable region, there are fewer interaction commands between the processing unit and the touch control chip, thereby improving the updating efficiency of the configuration file.

Optionally, the method further includes: reading the second configuration module from the global variable region. Since the global variable region is dedicated to storing the second configuration module, the processing unit can directly read the second configuration module from the global variable region, thereby improving the reading efficiency of the configuration file.

Embodiment 5

Figure 9:
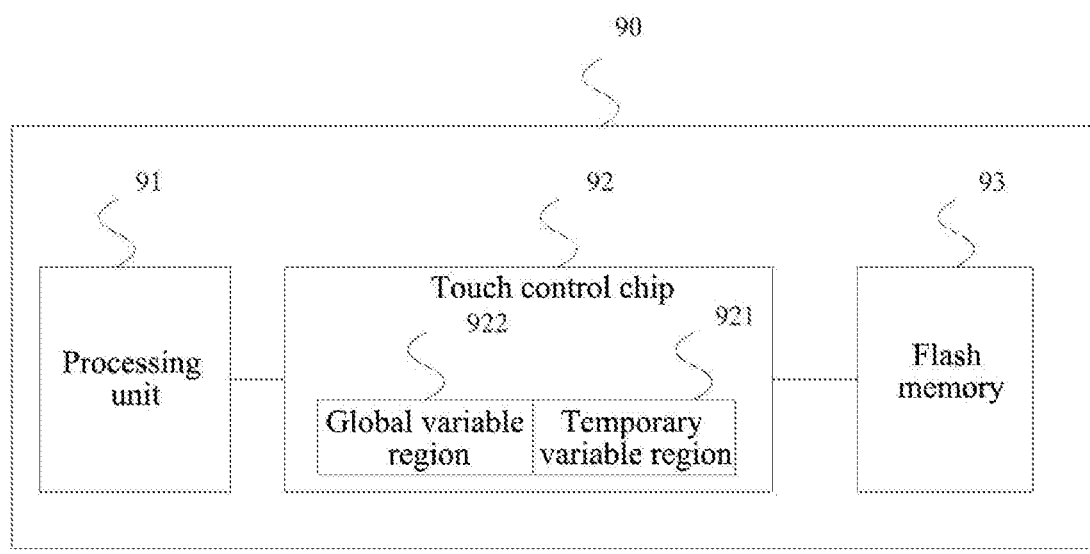
FIG. 9 is a schematic structural diagram of a touch device 90 provided by an embodiment of the present application.

FIG. 9 is a schematic structural diagram of a touch device 90 provided by an embodiment of the present application. As shown in FIG. 9, the device 90 may be a mobile phone, a notebook computer, a computer, a digital broadcast terminal, a messaging device, a game console, a tablet device, a medical device, a fitness device, a personal digital assistant, a kitchen appliance, a bathroom appliance, an air conditioner, and a lighting lamps or other smart terminals with a touch screen, a touch panel or a touch button. The device 90 includes a processing unit 91, a touch control chip 92 and a flash memory 93. The processing unit 91 may be an MCU, a CPU, a GPU or the like.

The processing unit 91 is configured to determine a configuration file of the touch control chip and write the configuration file to the touch control chip. The configuration file includes a plurality of first configuration modules which are respectively configured to configure parameters of different attributes for the touch control chip.

The touch control chip 92 is configured to parse the configuration file to obtain a parsed configuration file; and configure the parsed configuration file to each algorithm module of the touch control chip.

Optionally, the touch control chip 92 includes a temporary variable region 921 which is configured to temporarily store the configuration file and the non-configuration file of the touch control chip in different time periods, respectively; and the processing unit 91 is specifically configured to write the configuration file to the temporary variable region 921 when determining that the temporary variable region 921 is currently in an idle state.

Optionally, the touch control chip 92 is further configured to store the parsed configuration file to the flash memory 93 and delete the configuration file in the temporary variable region 921.

Optionally, the processing unit 91 is further configured to send a read request to the touch control chip 92 when determining that the temporary variable region 921 is currently in an idle state; and the touch control chip 92 is further configured to read the parsed configuration file from the flash memory 93 to the temporary variable region 921 according to the read request.

The processing unit 91 is further configured to read the parsed configuration file from the temporary variable region 921.

Optionally, the touch control chip 92 further includes a global variable region 922 which is configured to store at least one second configuration module, where the at least one second configuration module is obtained after at least one corresponding first configuration module is updated; the processing unit 91 is further configured to write the at least one second configuration module to the global variable region 922; and the touch control chip 92 is further configured to parse the at least one second configuration module and configure the parsed at least one second configuration module to at least one corresponding algorithm module of the touch control chip.

Optionally, storage space of the global variable region 922 is smaller than storage space of the temporary variable region 921, and a starting storage address of the temporary variable region 921 is smaller than a starting storage address of the global variable region 922.

Optionally, the processing unit 91 is further configured to read the at least one second configuration module from the global variable region 922.

The touch device provided by the embodiment of the present application can perform the method for processing a configuration file provided by the present application, and the implementation principle and technical effects thereof are similar, which are not described herein again.

Embodiment 6

The application further provides a processing unit which may be an MCU, a CPU, a GPU or the like. The processing unit is configured to: determine a configuration file of a touch control chip; write the configuration file to the touch control chip; where the configuration file includes a plurality of first configuration modules which are respectively used for configuring parameters with different attributes for the touch control chip.

Optionally, the touch control chip includes a temporary variable region which is configured to temporarily store the configuration file and a non-configuration file of the touch control chip in different time periods, respectively; and the processing unit specifically configured to write the configuration file to the temporary variable region when determining that the temporary variable region is currently in an idle state.

Optionally, the processing unit is further configured to send a read request to the touch control chip when determining that the temporary variable region is currently in an idle state, so that the touch control chip reads the parsed configuration file from a flash memory to the temporary variable region according to the read request; and read the parsed configuration file from the temporary variable region.

Optionally, the touch control chip further includes a global variable region which is configured to store at least one second configuration module, where the at least one second configuration module is obtained after at least one corresponding first configuration module is updated; and the processing unit is further configured to write the at least one second configuration module to the global variable region.

Optionally, storage space of the global variable region is smaller than that of the temporary variable region, and a starting storage address of the temporary variable region is smaller than that of the global variable region.

Optionally, the processing unit is further configured to read the at least one second configuration module from the global variable region.

The processing unit provided by the embodiment of the present application can perform a method for processing configuration file performed by the processing unit provided by the present application, and the implementation principle and technical effects thereof are similar, which are not described herein again.

Embodiment 7

The present application further provides a touch control chip. The touch control chip is configured to: obtain a configuration file of the touch control chip; parse the configuration file to obtain a parsed configuration file; and configure the parsed configuration file to each algorithm module of the touch control chip; where the configuration file includes a plurality of first configuration modules which are respectively configured to configure parameters of different attributes for the touch control chip.

Optionally, the touch control chip includes a temporary variable region which is configured to temporarily store the configuration file and a non-configuration file of the touch control chip in different time periods, respectively; and the touch control chip is further configured to store the parsed configuration file to a flash memory and delete the configuration file in the temporary variable region.

Optionally, the touch control chip is further configured to receive a read request, and read the parsed configuration file from the flash memory to the temporary variable region according to the read request.

Optionally, the touch control chip further includes a global variable region which is configured to store at least one second configuration module, where the at least one second configuration module is obtained after at least one corresponding first configuration module is updated. Correspondingly, the touch control chip is further configured to: obtain the at least one second configuration module; and parse the at least one second configuration module and configure the parsed at least one second configuration module to at least one corresponding algorithm module of the touch control chip.

Optionally, the storage space of the global variable region is smaller than that of the temporary variable region, and a starting storage address of the temporary variable region is smaller than that located in the global variable region.

The touch control chip provided by the embodiment of the present application can perform the method for processing a configuration file executed by the touch control chip provided by the present application, and the implementation principle and technical effects thereof are similar, which are not described herein again.

The above embodiments may be implemented in whole or in part by software, hardware, firmware, or any combination thereof. When implemented by software, it may be implemented in whole or in part in the form of a computer program product. The computer program product includes one or more computer instructions. When the computer program instructions are loaded and executed on a computer, the processes or functions described in accordance with the embodiments of the present disclosure are generated in whole or in part. The computer can be a general purpose computer, a special computer, a computer network, or other programmable devices. The computer instructions can be stored in a computer readable storage medium or transferred from one computer readable storage medium to another computer readable storage medium, for example, the computer instructions can be transferred from a website site, a computer, a server, a data center to another website site, computer, server, data center through wire (for example, coaxial cable, fiber optic, digital subscriber line (DSL) or wireless (for example, infrared, wireless, microwave). The computer readable storage medium can be any available media that can be accessed by a computer, or a data storage device such as a server, data center that includes one or more available media. The available medium may be a magnetic medium, such as a floppy disk, a hard disk, a magnetic tape, an optical medium, such as a DVD, or a semiconductor medium, such as a Solid State Disk (SSD) or the like.

Finally, it should be noted that each of the above embodiments is only used for illustrating the technical solutions of embodiments of the present disclosure, rather than limiting them; although the embodiments of the present disclosure are illustrated in detail with reference to each of the aforementioned embodiments, those ordinary skilled in the art should understand: the technical solutions recorded in each of the aforementioned embodiments can still be modified, or part or all of the technical features can be substituted equivalently; however, these modifications or substitutions do not make the essence of the corresponding technical solutions depart from the scope of the embodiment solutions of the present disclosure.

What is claimed is:

1. A method of processing a configuration file, comprising:
   obtaining the configuration file of a touch control chip;
   parsing the configuration file to obtain a parsed configuration file; and
   configuring the parsed configuration file to each algorithm module of the touch control chip; wherein the configuration file comprises a plurality of first configuration modules and the plurality of first configuration modules are used for configuring parameters of different attributes for the touch control chip, respectively;
wherein the touch control chip comprises a global variable region and the global variable region is used for storing at least one second configuration module, wherein the at least one second configuration module is at least one updated first configuration module; and
the method further comprises:
obtaining the at least one second configuration module; and
parsing the at least one second configuration module, and configuring the parsed at least one second configuration module to at least one corresponding algorithm module of the touch control chip.

2. The method according to claim 1, wherein the touch control chip comprises a temporary variable region, wherein the temporary variable region is used for temporarily storing the configuration file and a non-configuration file of the touch control chip in different time periods, respectively; and
after the parsing of the configuration file to obtain the parsed configuration file, the method further comprises:
storing the parsed configuration file to a flash memory and deleting the configuration file in the temporary variable region.

3. The method according to claim 2, further comprising:
receiving a read request; and
reading the parsed configuration file from the flash memory to the temporary variable region according to the read request.

4. The method according to claim 2, wherein storage space of the global variable region is smaller than storage space of the temporary variable region, and a starting storage address of the temporary variable region is smaller than a starting storage address located in the global variable region.

5. A processing unit, wherein the processing unit is configured to:
determine a configuration file of a touch control chip; and
write the configuration file to the touch control chip;
wherein the configuration file comprises a plurality of first configuration modules and the plurality of first configuration modules are configured to configure parameters of different attributes for the touch control chip respectively;
wherein the touch control chip comprises a global variable region and the global variable region is configured to store at least one second configuration module, wherein the at least one second configuration module is at least one updated first configuration module; and
the processing unit is further configured to:
write the at least one second configuration module to the global variable region; and
parse the at least one second configuration module, and configure the parsed at least one second configuration module to at least one corresponding algorithm module of the touch control chip.

6. The processing unit according to claim 5, wherein the touch control chip comprises a temporary variable region and the temporary variable region is configured to temporarily store the configuration file and a non-configuration file of the touch control chip in different time periods, respectively; and
the processing unit is configured to:
write the configuration file to the temporary variable region when it is determined that the temporary variable region is currently in an idle state.

7. The processing unit according to claim 6, wherein the processing unit is further configured to:
send a read request to the touch control chip when it is determined that the temporary variable region is currently in the idle state, so that the touch control chip reads a parsed configuration file from a flash memory to the temporary variable region according to the read request; and
read the parsed configuration file from the temporary variable region.

8. The processing unit according to claim 6, wherein storage space of the global variable region is smaller than storage space of the temporary variable region, and a starting storage address of the temporary variable region is smaller than a starting storage address of the global variable region.

9. The processing unit according to claim 5, wherein the processing unit is further configured to read the at least one second configuration module from the global variable region.

10. A touch control chip, wherein the touch control chip is configured to:
obtain a configuration file of the touch control chip;
parse the configuration file to obtain a parsed configuration file; and
configure the parsed configuration file to each algorithm module of the touch control chip;
wherein the configuration file comprises a plurality of first configuration modules and the plurality of first configuration modules are configured to configure parameters of different attributes for the touch control chip, respectively;
wherein the touch control chip comprises a global variable region and the global variable region is configured to store at least one second configuration module, wherein the at least one second configuration module is at least one updated first configuration module; and
the touch control chip is further configured to:
obtain the at least one second configuration module; and
parse the at least one second configuration module, and configure the parsed at least one second configuration module to at least one corresponding algorithm module of the touch control chip.

11. The touch control chip according to claim 10, wherein the touch control chip comprises a temporary variable region, wherein the temporary variable region is configured to temporarily store the configuration file and a non-configuration file of the touch control chip in different time periods, respectively; and
the touch control chip is further configured to:
store the parsed configuration file to a flash memory and delete the configuration file in the temporary variable region.

12. The touch control chip according to claim 11, wherein the touch control chip is further configured to:
receive a read request; and
read the parsed configuration file from the flash memory to the temporary variable region according to the read request.

13. The touch control chip according to claim 11, wherein storage space of the global variable region is smaller than storage space of the temporary variable region, and a starting storage address of the temporary variable region is smaller than a starting storage address located in the global variable region.

* * * * *